3 Sheets--Sheet 1.
H. L. PERRINE.
Air-Brake.
No. 166,404. Patented Aug. 3, 1875.
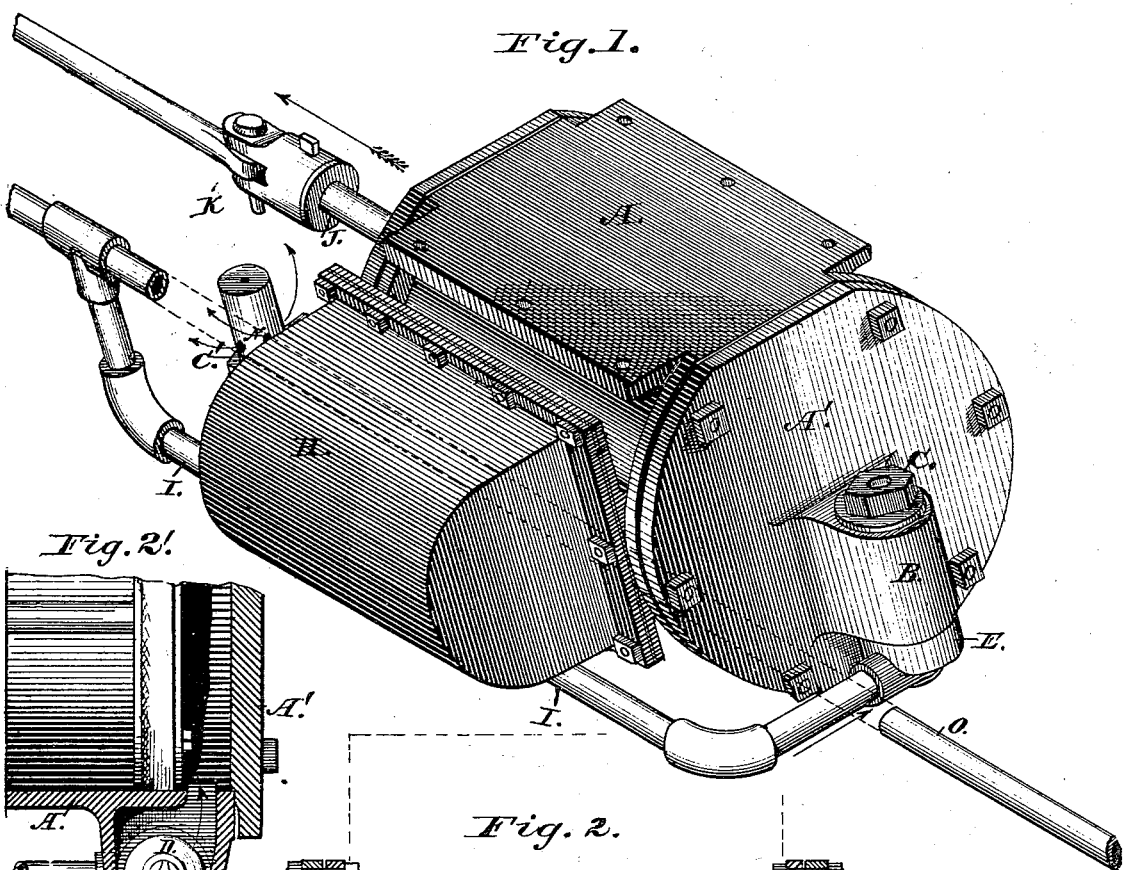
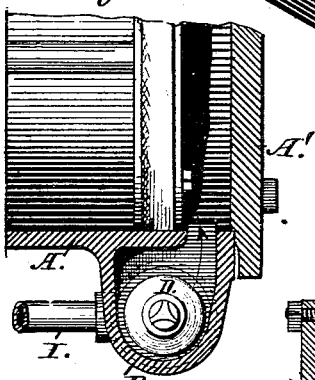
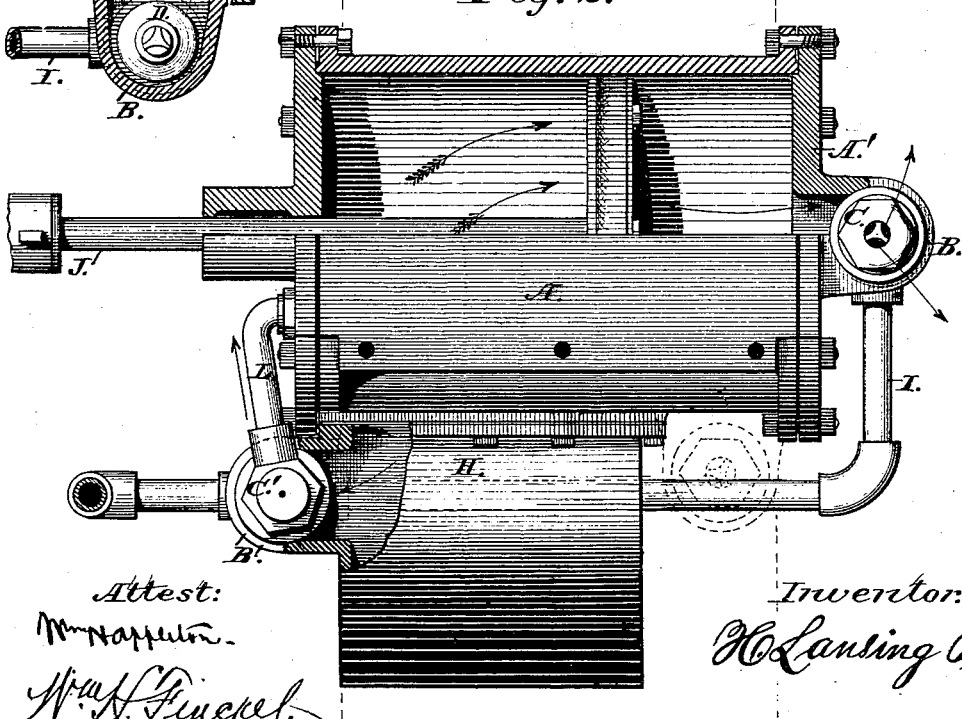
Attest:
Inventor:
H Lansing Perrine

H. L. PERRINE.
Air-Brake.

No. 166,404.  Patented Aug. 3, 1875.

Fig. 4¹.

Attest:  
Inventor:  
H Lansing Perrine.

3 Sheets--Sheet 3.
H. L. PERRINE.
Air-Brake.
No. 166,404. Patented Aug. 3, 1875.
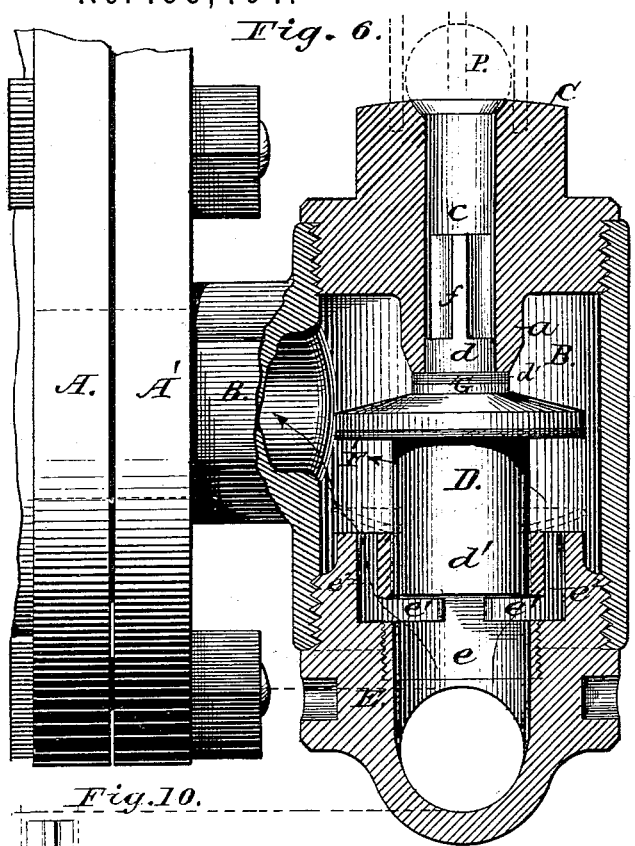
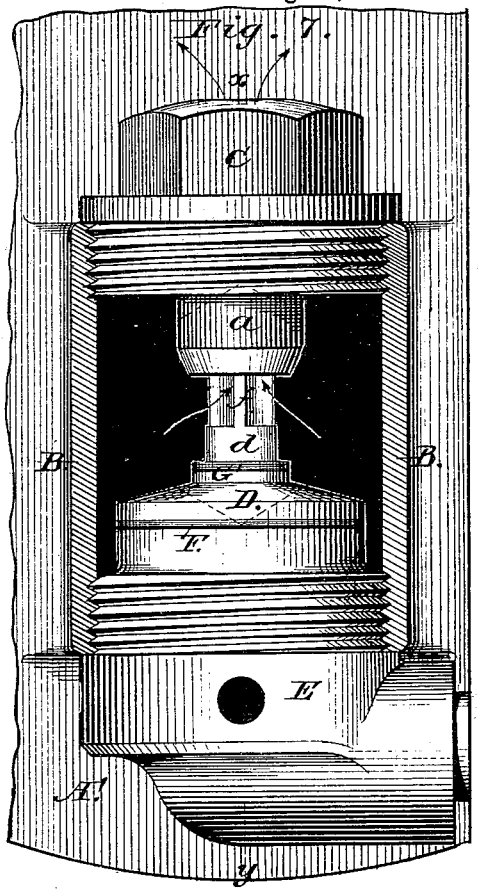
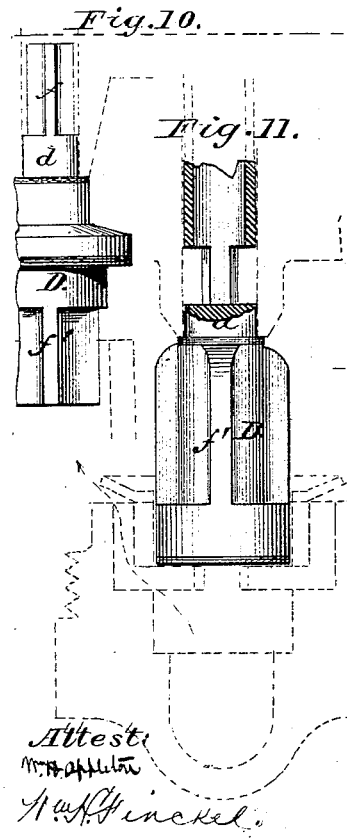
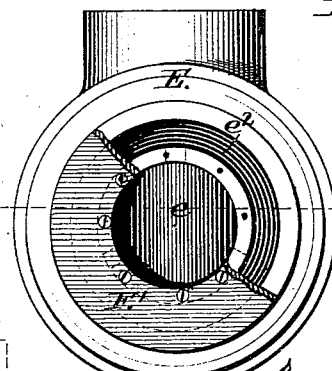
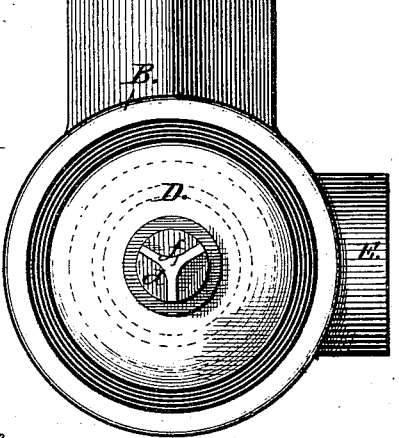
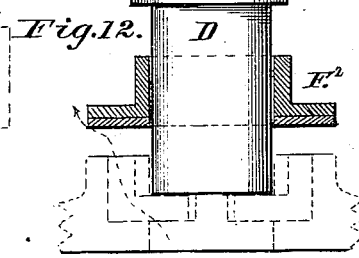
Inventor.
H Lansing Perrine.
Attest:

UNITED STATES PATENT OFFICE.

H. LANSING PERRINE, OF FREEHOLD, NEW JERSEY.

IMPROVEMENT IN AIR-BRAKES.

Specification forming part of Letters Patent No. 166,404, dated August 3, 1875; application filed May 26, 1875.

*To all whom it may concern:*

Be it known that I, H. LANSING PERRINE, of Freehold, in the county of Monmouth and State of New Jersey, have invented certain new and useful Improvements in Air-Brakes, of which the following is a specification:

This invention is in the nature of an improvement in brakes operated by compressed air, steam, or other equivalent motive power; and the invention consists, broadly, in a valve and reservoir attachment to the brake-cylinder supplied with the motive power from a single line of pipe, whereby the piston is positively actuated both in applying and taking off the brakes.

Figure 3:
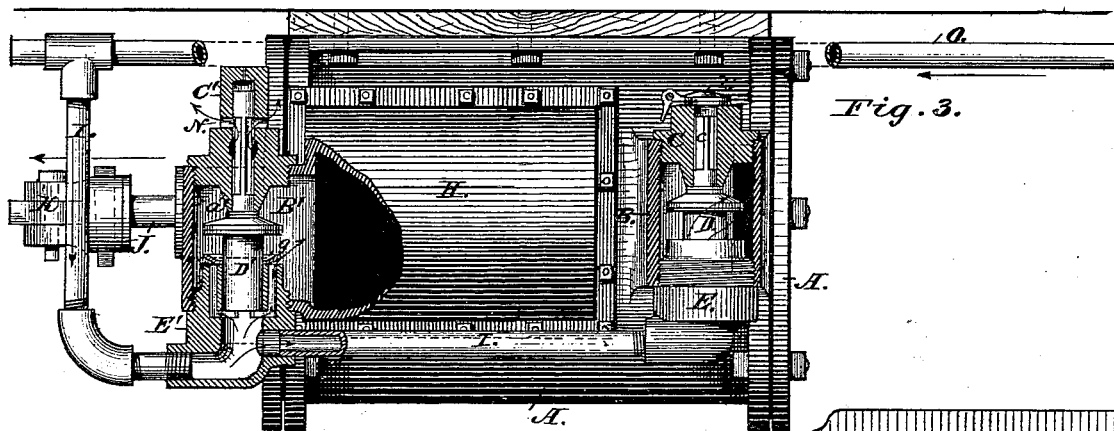
Figure 4:
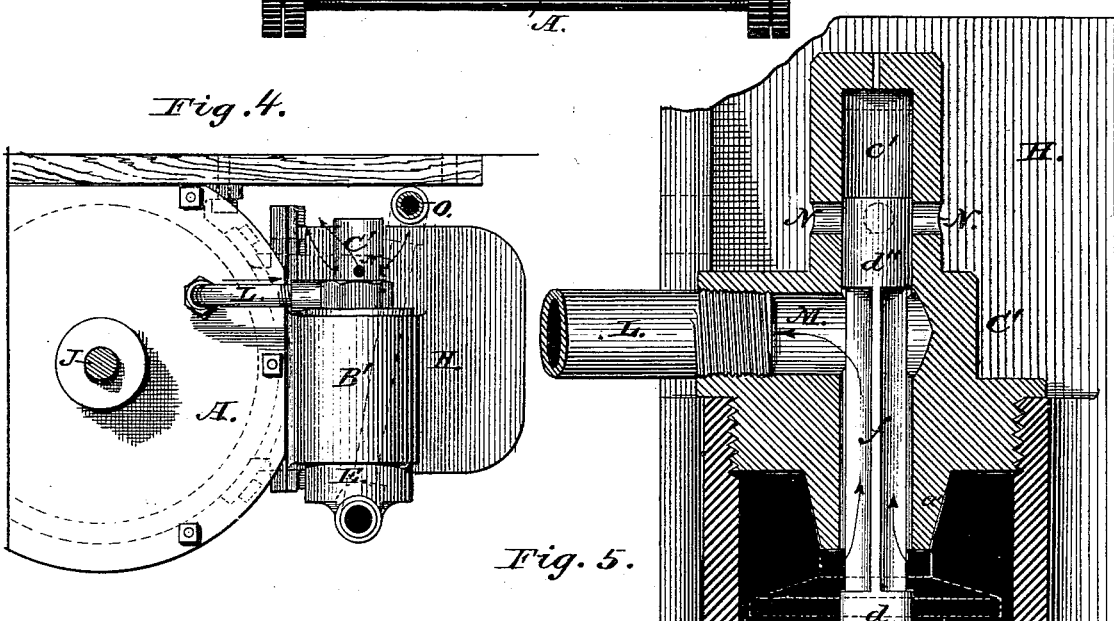
Figure 5:
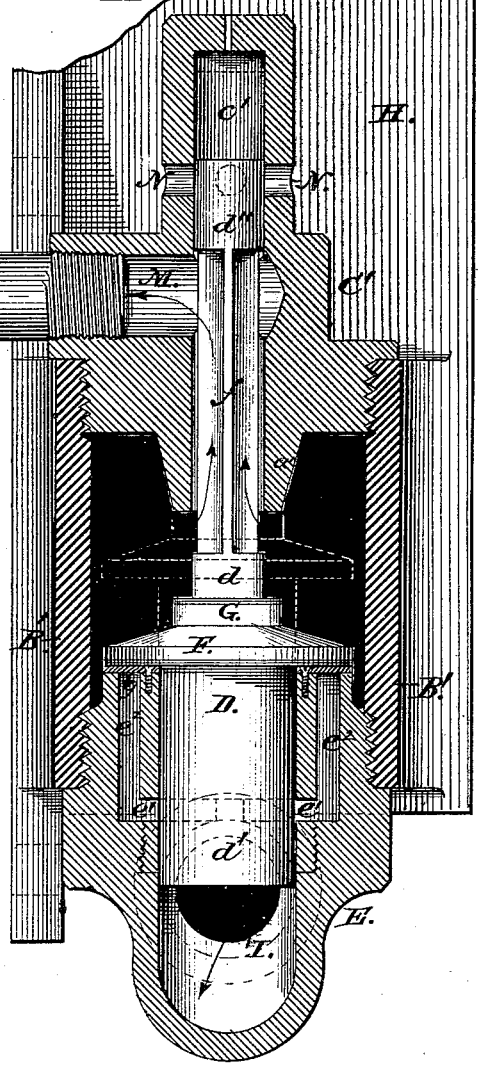

In the drawings illustrating my invention, Figure 1 is a perspective view of my apparatus applied to the brake-cylinder. Fig. 2 is a top and partly sectional view, and Fig. 2' a horizontal cross-section of a part of the cylinder, with the cylinder valve-casing forming part of and placed at one side of the cylinder, as is also indicated by the dotted lines of Fig. 2. Fig. 3 is a side elevation of my mechanism with the valves partly in section, and a portion of the reservoir broken away, the parts being in position for putting on the brakes. Fig. 4 is an end view of the cylinder and reservoir valve. Fig. 4' is a similar view of the same, but showing the reservoir secured to the bottom of the car instead of to the cylinder, and indicating in dotted lines the position of the cylinder-valve. Fig. 5 is a vertical section of the reservoir-valve, showing the valve proper in position for supplying air to the cylinder for the purpose of forcing off the brakes. Fig. 6 is a vertical section of the cylinder-valve, in position for taking air for supplying the brakes. Fig. 7 is an elevation of the cylinder-valve with the casing broken away, such casing being made with the cylinder-head. Fig. 8 is a top view of the valve-seat, and Fig. 9 is a plan view of the interior of the valve; Figs. 10, 11, and 12, modified forms of the valve, hereinafter particularly described.

The letter A represents a brake-cylinder of ordinary construction, whose head A' may be made with a semicylindrical or other-shaped valve-casing, B, and which cylinder is provided with a reservoir, H, bolted to or otherwise connected therewith by branch pipes I, through valves B and B', the former connected directly with the cylinder at its head, as in Figs. 1 and 6, or at the side, as in Fig. 2', and the latter secured to the reservoir H, and leading from said reservoir to the cylinder through a branch pipe, L.

As indicated in Fig. 3, when the brakes are off and it is desired to apply them, the air or other motive power is turned on into the supply-pipe O, and thence into the branch-pipe I, opening the valves B' and B, thereby escaping into the reservoir or storing chamber H, through valve B', and into the cylinder through valve B; but the valve B' must be of such construction as to prevent admission of air through pipe L into the cylinder at this time. The air admitted through valve B drives out the piston, thereby forcing on the brakes.

When the brakes are to be taken off, the supply of air is exhausted from the pipe O, which will cause both valves to set in such a manner as to cut off any passage of air from pipes O and I through them. At the same time the air that has driven out the piston flows back into valve B, and escapes into the atmosphere through ports opened at this time for the purpose. Simultaneously with this, the valve B' is in position to allow the air from reservoir H to escape through pipe L into the cylinder, and the pressure thereof will drive the piston back so as to take off the brakes, thus accomplishing a positive forcing on and off of the brakes by power controlled directly at the brake-cylinder through a single line of pipe, and avoiding the necessity of conveying such power back and forth from the main reservoir, as has been heretofore done.

Before the brakes can be again applied, the air in the cylinder that has been used to force off the brakes must escape, and this is accomplished by constructing the reservoir-valve B' with an exhaust-passage opening into the atmosphere, so arranged that the air may flow back through pipe L from the cylinder into the valve, and out of such passage, but not into the reservoir, nor into the pipes O I.

I have shown valves for accomplishing these several operations. Figs. 6 and 7 show a cylinder-valve in position for receiving and exhausting air, respectively. This valve B may be fitted in a casing and screwed into the cylinder-head, as in Fig. 6; or such casing may form a part of the head, as in Figs. 1, 2, and 7; or it may be cast with and on the periphery of the cylinder, as in Figs. 2 and 2'. This valve is provided with a nut or plug, E, fitted into the lower end of the casing, and having a central well, $e$, from which radiate ports $e^1$ that are extended into vertical openings $e^2$, which may be covered by a flat valve, F', Fig. 8, constructed of an annulus of rubber, or the like. This plug or nut forms the seat of a check-valve, D, which is made with a plunger, $d'$, that works in the well $e$, to open and close the ports $e^1$, and also made with a packed or other flange, F, fitting over openings $e^2$. Said valve has a packed shoulder, G, and a plunger, $d$, that open and close the mouth of a cylindrical projection, $a$, of a hollow nut, C, opening into the atmosphere, which is screwed into the upper end of the casing to close it. The stem of the valve D is extended upwardly into the nut C and formed with cavities or ports $f$. The incoming air, acting on plunger $d'$, lifts it above the ports $e^1$, through which ports the air escapes against the flange F, thus raising the valve its full height, and at the same time cutting off escape through nut C by first forcing the plunger $d$ into projection $a$, and finally bringing the packed shoulder G against its mouth, thereby admitting air into the cylinder to drive the brakes on, and preventing its escape into the atmosphere, as indicated in Figs. 3 and 6. As soon as the air is exhausted from the supply-pipes the absence of pressure on the under side of the check-valve, added to the pressure of the reflux air from the cylinder, sets the valve—that is, causes flange F and plunger $d'$ to close the ingress ports—whereby the shoulder G and plunger $d$ fall below the mouth of projection $a$, so as to bring the ports $f$ in position to allow the air to escape or exhaust through nut C, as indicated in Figs. 2 and 7. If the opening in the nut C extend centrally through it, its outer end may be provided with any suitable valve P to exclude dust, &c. This valve may be variously modified, see Fig. 10, where the plunger below the flange is grooved at $f'$; also, Fig. 11, where the flange is dispensed with and the upper part of the plunger grooved and the stem made hollow instead of grooved, and having openings therein, just above the plunger, so that the escape is through the stem instead of on its surface. In this form the flap-valve only is used for closing the outer ends of ports $e^2$. In Fig. 12 a sliding flange, $F^2$, is employed.

The operations of the plunger $d$ and shoulder G in opening and closing the nut C are coincident with the motions of the plunger $d'$ and flange F, or equivalents, in closing and opening the ports $e^1$ $e^2$.

The reservoir-valve B' is shown in detail in Figs. 3 and 5, and, as will be seen, it is of substantially the same form and construction as valve B. The upper closing nut C' is of different construction, however, and so also is the stem. A screw-threaded recess, M, is made at right angles to the hollow or well in the nut C', into which the pipe L is fitted, and said nut is extended vertically into a tube, $c'$, which is made with radial ports N that open into the atmosphere. The stem is elongated, and the ports $f$ are terminated in a plunger or valve, $d''$, which operates to open and close passages N. When air is being taken to apply the brakes it escapes through valve B' into the reservoir, and when the valve is in this position, (see Fig. 3,) all escape of air through the nut C' from the reservoir or valve is prevented by the plunger $d$ and shoulder G closing the mouth of projection $a'$; but at the same time the air that had been previously used for forcing off the brakes flows back through pipe L into the nut C', and the ports N being open, it escapes into the atmosphere. In this valve I prefer always to use a flat valve, $g$, so as to insure the instant closing of the valve the moment the supply of air is stopped. I also prefer to make the plunger $d'$ of such length as to partly cover the opening into the pipe leading to valve B, whereby the valve B' is opened first, so as to insure a full supply of air in the reservoir.

It will be observed that when the valve is open the ports N are likewise open, but the mouth of projection $a'$ is closed, and vice versa. Now, when these valves B and B' are applied, as in Figs. 1, 2, and 3, the admission of air into the pipes O I will open both valves, admitting air into the reservoir through the valve B', and into the cylinder through valve B. At this time any air in the reservoir end of the cylinder may escape through passages N. When the brakes are to be forced off the exhaustion of air from the supply-pipe will set the valves, thereby allowing the air used for putting on the brakes to escape through nut C in valve B, and allowing the air in the reservoir to escape through nut C' and pipe L into the cylinder. The piston may be arranged to work from the other end of the cylinder, in which case the air stored in chamber H will be used for forcing the brakes on, and the direct application of the motive-power from the pipe will effect the taking off of the brakes. By this construction, it will be understood that the action of the brakes is after the continuous or automatic system. It will be necessary in this case to increase the capacity of the reservoir. This construction will form subject-matter for a future application for a patent.

The valve mechanism above described may be applied to cylinders already in use by building a separate reservoir, H, and securing it near the cylinder to the car-floor, as indicated in Fig. 4.

Figure 13:
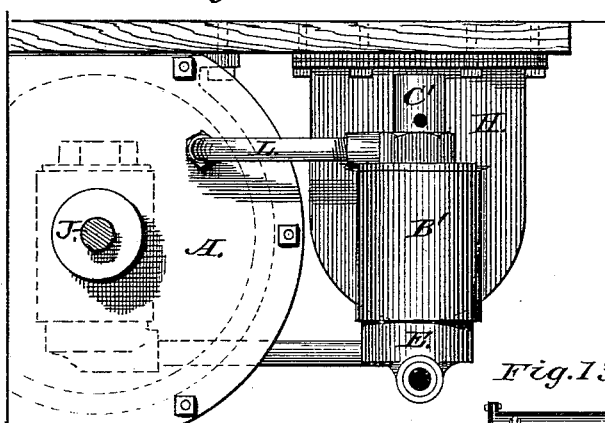

The valve B may be dispensed with, and only the valve B' and reservoir employed. In this case a pipe leading from the supply-pipe directly to the cylinder will be used to drive on the brakes, but when the brakes are to be taken off the air in the cylinder is exhausted at the locomotive. The valve B' may be dispensed with, and only the valve B be used, (see Fig. 13,) which is a horizontal section of cylinder and attachments. In this case two openings, a a', are made from the cylinder into the reservoir, one of which should be provided with a check-valve, i. The air coming into the cylinder forces out the piston until it passes the first opening, when such air escapes therethrough into the reservoir. The supply of air being cut off, that in the cylinder exhausts through the nut C in valve B, and the air in the reservoir escapes through the port or opening a, and, acting against the piston, forces it back—the flap or check on the ingress opening a' preventing the escape of air through that opening.

Having thus described my invention, what I claim as new, and desire to secure by Letters Patent, is—

1. The combination of the piston of a brake-cylinder with an auxiliary reservoir and automatic valve, substantially as specified, whereby the brakes are forced off by means of compressed air stored within the auxiliary cylinder while the brakes are being forced on, the automatic valve being governed in its action by the varying pressure of the air within the pipe leading thereto.

2. The combination of the main supply and exhaust valve of the brake-cylinder and the automatic supply and exhaust valve of the auxiliary reservoir with a single supply-pipe, substantially as specified, whereby the compressed air, after having exerted its power upon either side of the piston, is exhausted from the cylinder directly into the atmosphere.

3. The combination of the differential check-valve D, having a grooved stem, d, with cap E, having an annular port, and cap C, the latter constituting a guide for the grooved stem, substantially as and for the purpose described.

4. The combination of the differential check-valve D', having a piston formed on the end of its grooved stem, with an auxiliary reservoir, brake-cylinder, and exhaust-ports, substantially as specified, whereby the valve, when seated by the pressure of air within the reservoir, allows the confined air to force off the brakes, and, when raised from its seat, allows the air to escape or exhaust from the cylinder.

This specification signed by me this 26th day of May, A. D. 1875.

H. LANSING PERRINE.

Witnesses:
  A. C. BRADLEY,
  WM. H. FINCKEL.